Nov. 9, 1971                J. H. COULT                    3,618,153
     HAND-HELD LITTER-COLLECTING DEVICE WITH COOPERATING
                  FIXED AND ROTATED BRUSHES
Filed Nov. 13, 1969                              2 Sheets-Sheet 1
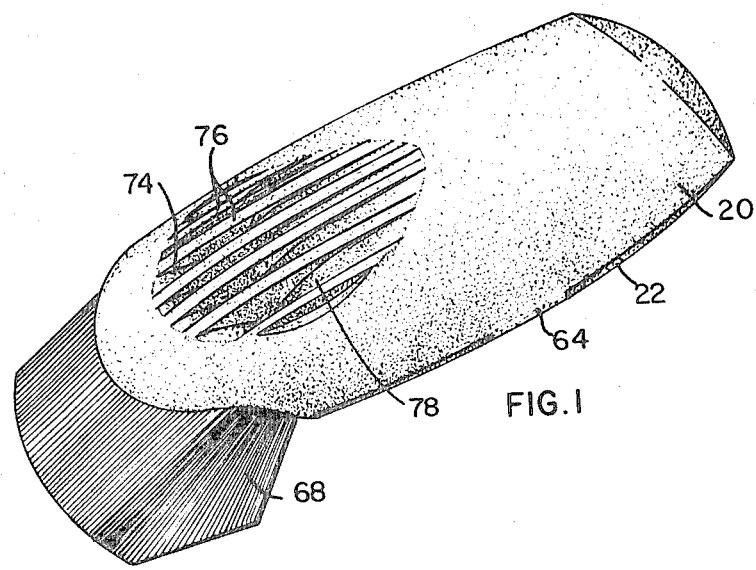
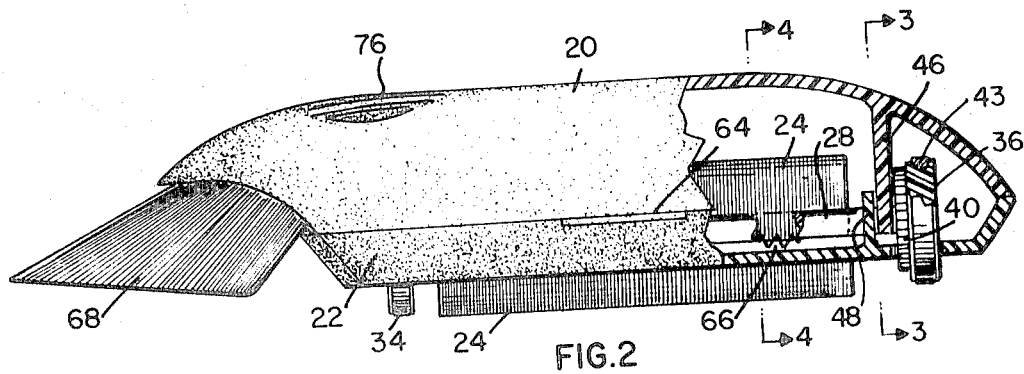
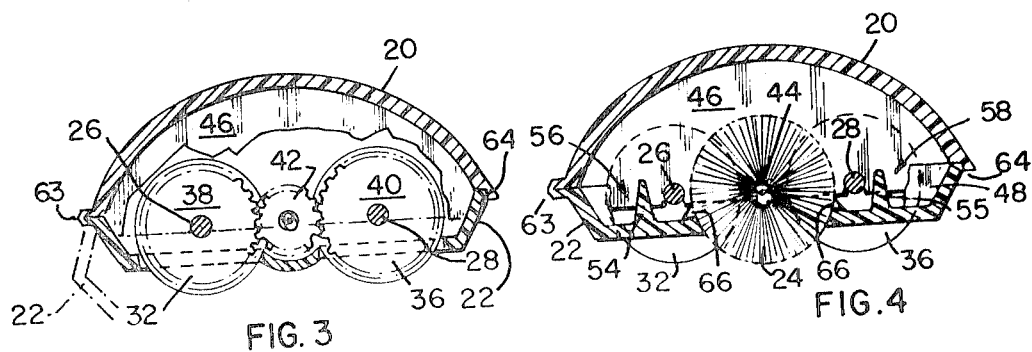
JOHN H. COULT
INVENTOR
AND
ATTORNEY

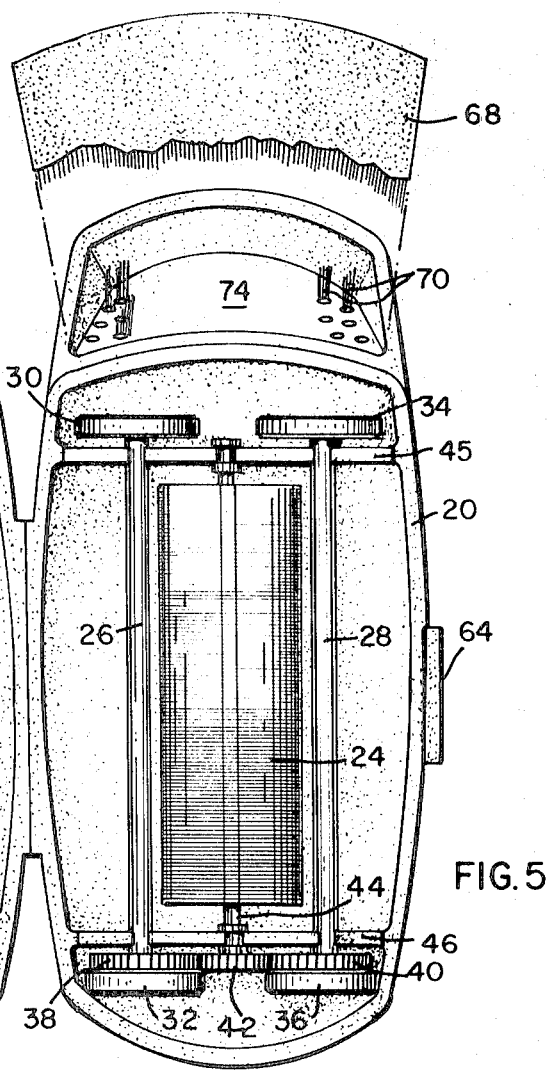

United States Patent Office 3,618,153
Patented Nov. 9, 1971

3,618,153
HAND-HELD LITTER-COLLECTING DEVICE WITH COOPERATING FIXED AND ROTATED BRUSHES
John H. Coult, 1 Leland Road, Natick, Mass. 01760
Filed Nov. 13, 1969, Ser. No. 876,235
Int. Cl. A47l *11/00*
U.S. Cl. 15—41
20 Claims

ABSTRACT OF THE DISCLOSURE

This disclosure depicts a litter collecting device having a fixed brush extending from an end of a housing therefor adapted for cooperation with a cylindrical brush mounted within the housing and driven by a friction drive train. The device is configured to nest comfortably in the open grip of a user's hand and embodies a number of novel structures.

BACKGROUND OF THE INVENTION

Today's homemaker has at her disposal a great variety of manually and electrically powered cleaning implements and appliances for removing surface matter, many having vacuuming as well as sweeping capability. Floor and canister-type vacuum cleaners and manual floor sweepers are efficient and certainly justify the energy expenditure required to obtain and put such into operation where the littered area is large and the litter is accessible to these appliances. However, a substantial portion of the homemaker's energies are spent extremely inefficiently removing small deposits of localized surface litter, such as crumbled food or other particles, on carpeting, upholstery, and the like with large and relatively cumbersome appliances. In many circumstances, the large appliances are incapable of gaining access to the litter (e.g. along baseboards, on billiard tables, etc.) or are very inconvenient to use (e.g. on carpeted stairways). The hand-held friction-driven devices which have been offered from time to time to handle these special litter problems are bulky, inconvenient, cumbersome in use, unsatisfactory in performance and, of great importnace, are likewise largely incapable of gaining access to litter in hard to reach areas such as under low overhangs, close to baseboards, etc.

PRIOR ART 594,732, Fretwell
894,011, Kampte
1,115,023, Rees
1,236,122, Suttle
1,371,615, Frankel et al.

Each of the above shows hand-held friction powered rotary brush devices, the latter four disclosing structures having litter collecting capability. None incorporates or suggests the claimed novel fixed brush designed to cooperate in the stated way with rotary brush means, nor the novel housing and support structures and features claimed, nor a handle-free housing designed to nest comfortably in the user's hand in operation for optimized convenience and effectiveness, nor any of the other novel combinations herein claimed.

OBJECTS OF THE INVENTION

It is an object of this invention to satisfy the above-described needs with a novel hand-held litter-collecting device capable of efficiently, quickly and easily removing and collecting loose litter from a great variety of surfaces and from hard to reach areas.

It is another object to provide a litter-collecting device having a compact, strong yet lightweight and economical molded construction. It is a further object to provide a litter-collecting device which is adapted to nest comfortably in a user's hand, is highly maneuverable and reliable, and is easily cleaned.

Further objects and advantages of this invention will in part be obvious and will in part become apparent as the following description proceeds. The features of novelty which characterize the invention will be pointed out with particularity in the claims annexed to and forming a part of this specification.

BRIEF DESCRIPTION OF THE DRAWINGS

FIG. 1 is a perspective view of a preferred embodiment of the invention in a state of readiness for operation;

FIG. 2 is a side elevational view of the FIG. 1 device partly broken away to show internal components thereof;

FIG. 3 is a sectional view taken along lines 3—3 in FIG. 2 with an internal wall partly broken away to show the friction drive mechanism for the device; the view also shows in skeleton lines a lower housing shell as it would appear when rotated downwardly to dump litter collected therein;

FIG. 4 is a sectional view taken along lines 4—4 in FIG. 2;

FIG. 5 is a top view of the device as it appears when opened;

FIG. 6 is an enlarged fragmentary sectional view of a drive wheel and gear member shown in FIGS. 2–4;

FIG. 7 is an enlarged fragmentary view of a finger-releasable catch for maintaining the housing shells in a closed position;

FIG. 8 is an enlarged fragmentary side elevational view of the integral hinge for the device shown in FIGS. 1, 3, 4 and 5, the hinge being shown slightly open to clarify its construction; and FIG. 9 is an enlarged fragmentary view of an over-center spring-type hinge which may be incorporated in the device in lieu of the integral hinge shown in detail in FIG. 8.

DESCRIPTION OF THE PREFERRED EMBODIMENTS

The drawings illustrate a preferred embodiment representing but one of many litter-collecting devices which may be constructed to implement the principles and objects of this invention. The illustrated embodiment is an all-purpose device, finding special utility as a handy sweeping device for removing localized surface litter from rugs, carpets of all types, billiard tables, and the like.

The illustrated FIGS. 1–8 embodiment comprises a molded housing having an uper shell 20 mating with a lower shell 22. The housing is configured to nest comfortably in the open grip of a user's hand, being somewhat elongated with gently rounded corners. The illustrated configuration has been found to provide a comfortable and secure purchase on the device during use. The design of the housing is quite significant since in operation the device is held nestled in the user's hand and swept rapidly back and forth over the area being cleaned. Control of the device by the user is thus important.

The housing defines an enclosure containing a rotatable cylindrical brush 24 and a friction drive train for driving the brush 24. The brush 24 may be constructed in a number of ways, however, the preferred construction from the standpoint of economy is the twisted-in-wire method. Any of the twisted-in-wire brush variations will perform satisfactorily, however, I have found the simple single-stem, single spiral construction with a nylon (TM) fill to perform very well.

A variety of friction drive trains may be employed. In the illustrated embodiment, the friction drive train takes the form of a pair of axles 26, 28 with end-mounted wheels 30, 32 and 34, 36, respectively. The axles 26, 28 are disposed on opposite sides of the brush 24, driving the brush 24 through a transmission comprising a pair of spur gears 38, 40 on the axles 26, 28 and a pinion 42 affixed to the brush shaft 44.

In the illustrated embodiment (see especially FIG. 6), the drive wheels 32, 36 and associated gears 38, 40 are molded as a unitary structure. A tire 43 snapped in peripheral grooves in the wheels 30, 32, 34, 36 provides strong frictional engagement with the surface being cleaned.

A variety of arrangements are contemplated for journaling the friction-driven members (the wheels in this embodiment) and the brush 24 in the housing. The instant embodiment has the axles 26, 28 and brush shaft 44 supported in snap-in open-ended necked slots in a pair of septums 45, 46 extending transversely across the upper shell 20 near opposed ends thereof and integral therewith. A pair of integral septums 47, 48 in the lower shell 22 mate with the septums 45, 46 in an overlapping relationship, minimizing the possibility that the shells might jam in a partially open state. The septums 45, 46, in addition to supporting the wheel axles 26, 28 and brush 24, serve in cooperation with septums 47, 48 to lend structural strength to the housing, and further perform the important function of segregating the friction drive train and the litter-receiving chamber. It is evident that by this arrangement, the friction drive train is protected from fouling by matter thrown up from the surface by the brush.

The wheel axles and brush are preferably (although not necessarily) journaled in the septums 45, 46 in the upper shell 20 for the following reasons. First, the snap-in slot arrangement is much more secure when located in the upper shell septums rather than the lower shell septums, since a sharp upward blow on the wheels will not cause them to be dislodged from the slots. Secondly, this arrangement exposes the litter collected in the lower shell for rapid, facile and unobstructed removal.

The lower shell 22 defines the lower portion of the enclosure for the brush and friction drive train and contains on the floor thereof a relatively large rectangular opening 50 and four smaller openings 52 to allow access of the brush 24 and wheels to the surface to be cleaned.

The rapid sweeping motion imparted to the device during use has the effect of agitating collected matter. In order to prevent escape of collected matter through the opening 50 in the lower shell, in accordance with this invention, the lower shell 22 includes a parallel array of integral ribs 54, 55 extending upwardly from litter-collecting portions of the floor of shell 22 on opposite sides of the opening 50 to define primary litter-collecting pans 56, 58.

Although a large number of different housing constructions are within the purview of this invention, the preferred arrangement shown has the housing split into upper and lower shells meeting to form a cusp circumscribing the housing. A great variety of hinging constructions may be used. In the interest of economy of manufacture, the disclosed embodiment is illustrated as incorporating a hinge 63 of the integral type. See especially FIGS. 5 and 8. Alternatively, a hinge fashioned after the Rathbun design may be used. The Rathbun hinge is widely used in jewelry boxes, and comprised a socket joint secured by a pair of spring clips, one of which is illustrated at 60 in FIG. 9. The Rathbun-type hinge permits a wide selection of molding resins; further, the lower shell 22 may be flipped downwardly to quick dump the contents thereof by merely depressing the lower shell until the spring clips, which are being loaded as the shell is rotated, go "over center." When the housing is in its closed position, the spring forces in the clips hold the upper and lower shells tightly together. The illustrated preferred embodiment utilizing an integral hinge requires a latching instrumentality. To this end there is provided a resilient catch 64 molded integrally with the upper shell 20. The catch 64 snap-engages a flared projection 65 integral with the lower shell 22.

In the interest of removing lint, threads, etc. which might be captured by the cylindrical brush 24, brush combing means are provided. The illustrated combing means comprises two parallel rows of spaced teeth 66 projecting from and integral with the lower shell 22 of the housing. See especially FIGS. 4 and 5. As shown, the teeth 66 are configured to address closely but not interfere with the periphery of the brush as it turns. Filamentary materials entrained on the tips of the brush bristles will be deflected by the teeth onto collection areas on the floor of lower shell 22, or will become entangled in the teeth 66 from which they can be removed when the housing is cleaned. The teeth 66 also serve in some measure to prevent litter collected on the floor of shell 22 in the areas adjacent the brush opening 50 from escaping through the opening 50.

It is one of the above-stated objects and an extremely important aspect of this invention to provide a hand-held litter-collecting device which has the capability of gaining access to litter located in areas inaccessible to prior art devices, for example, along baseboards, in closely surrounded areas, in crevices, in folds, pockets and the like on upholstery, under overhangs (e.g. under the rails or bumpers on pool and billiard tables), etc. To this end, in accordance with this invention, the litter-collecting device incorporates a fixed brush 68. The brush 68 is preferably, though not necessarily, carried by an upper shell of a two-shell housing for the device as shown and described herein. The bristles constituting the brush 68 may be organized as tufts 70 which may be cemented or stapled or otherwise affixed in holes formed in a slab 74 molded integral with the upper shell 20.

The brush 68 may be trimmed such that the surface defined by the bristle ends makes a small acute angle with respect to the axis of the cylindrical brush 24 (and thus with respect to the surface being cleaned when in use), e.g. 3–15 degrees. I have found an angle of 5 degrees to provide excellent results. Further, it has been found to also be desirable to cause the bristle end surface to be disposed in part below the plane of the bottom surface of the housing, i.e. the plane in which the bottom surface of the housing should intersect the bristle end area. By exploiting these expedients of angling the bristle end surface and making the bristles of such length that the lower part of the bristle end surface is below the plane of the lower surface of the housing, a maximum average bristle length can be achieved with minimum drag on the device caused by the fixed brush when used on soft surfaces such as heavy pile carpets.

In order to provide structural support for the molded slab 74 and to provide continuity in the outer surface of upper shell 20, an array of ribs 76 are molded into the upper shell structure, bridging and interconnecting the oppositely sloping slab 72 and the sloping forward portions 78 of shell 20 which defines the enclosure for the cylindrical brush 24.

The fixed and rotatable brushes 68, 24 are interconnected and closely and cooperatively interrelated in operation as well as in structure as above described. The forward-extending disposition of the brush, its size, shape, and operative characteristics, and its arrangement with respect to the cylindrical brush 24, promote a close cooperation between the fixed brush 68 and the rotatable brush 24 during operation of the device. In operation, with continuous flowing, interrelated hand motions, litter is retrieved from inaccessible locations into access of the cylindrical brush and collected within the device.

The invention is not limited to the embodiments depicted which are merely illustrative. Other modifications and applications will occur to those skilled in the art without departing from the true spirit and scope of the invention, and it is intended that the subject matter of the above depiction be interpreted as illustrative and not in a limiting sense.

What is claimed is:

1. A hand-held sweeping device for collecting surface litter, comprising, in combination:
   a housing defining an enclosure having an opening in a bottom portion thereof and including litter collecting means;
   at least one cylindrical brush within said enclosure having bristles extending from a central shaft;
   means for supporting said cylindrical brush for rotation with a portion thereof protruding from said enclosure through said opening for engagement with the surface being cleaned;
   friction drive means for rotating said cylindrical brush, comprising:
      rotatable friction-driven means for engaging the surface being cleaned so as to be rotated by frictional forces when the device is moved across the surface,
      means for supporting said friction-driven means for rotation, and
      means coupling said brush shaft and said friction-driven means such that rotation of said friction-driven means effects rotation of said brush; and
   a fixed brush supported by said housing and having bristles extending outwardly from said housing for use in cooperation with said cylindrical brush,
   whereby to remove litter from a surface area, the device is held in the user's hand and swept back and forth across the surface, the fixed brush being used to brush litter inaccessible to said cylindrical brush into the path thereof.

2. The device defined by claim 1 wherein said housing is molded from a synthetic resin and comprises an upper shell and mating lower shell, said upper shell including first mounting means for mounting said fixed brush and second mounting means for mounting said friction-driven means and said brush shaft for rotation, said lower shell including said litter-collecting means for catching litter thrown into said housing by said cylindrical brush, said housing further including hinge means connecting said upper and lower shells for swinging said lower shell free of said upper shell to dump litter collected in said housing.

3. The device defined by claim 2 wherein said housing includes a pair of parallel septums in each of said upper and lower shells which are oriented transverse to said brush shaft and disposed near the ends of said housing, the respective pair constituents of the upper shell septum pair and lower shell septum pair cooperating to divide said enclosure into a litter-receiving chamber which contains said litter collecting means and opposed end portions, at least one of said end portions containing at least a part of said friction drive means, said septums furnishing structural suport for said housing, said pair of septums in said upper shell containing integrally said second mounting means for supporting said brush and friction-driven means for rotation.

4. The device defined by claim 3 wherein said respective pair constituents of the upper shell septum pair and lower shell septum pair mate in an overlapped side engagement relationship to form two parallel walls which accomplish said division in said enclosure and which are substantially impervious to dirt and litter.

5. The device defined by claim 3 wherein said litter-collecting means are each defined in part by an integral rib parallel to said brush shaft and extending upwardly from the floor of said lower shell.

6. The device defined by claim 1 wherein said housing is molded and is moderately elongated in the direction along the axis of said cylindrical brush, and wherein said fixed brush comprises:
   a base slab integral with said housing extending axially from an end of said housing and upwardly at an acute angle with respect to the axis of said brush shaft; and
   bristle means secured in a plurality of spaced holes in a lower surface of said base slab.

7. The device defined by claim 6 wherein said bristles are of lengths such that the bristle ends define a substantially planar surface making a small acute angle with respect to the axis of said cylindrical brush shaft.

8. The device defined by claim 7 wherein said acute angle lies in the range of about 3 degrees to 15 degrees.

9. The device defined by claim 7 wherein said surface defined by said bristle ends is intersected by a plane substantially containing the lowermost surface of said housing.

10. The device defined by claim 6 including a plurality of substantially parallel spaced ribs integral with said housing and bridging said base slab and said end of said housing from which said base slab extends, said ribs strengthening the structural connection of said base to said portion of said housing defining said enclosure.

11. The device defined by claim 1 wherein said friction drive means comprises two axles fixedly mounting end wheels, one axle being located on each side of said brush shaft, and gear means for coupling said axles to said brush shaft.

12. A hand-held sweeping device for collecting surface litter, comprising, in combination:
   a molded housing configured to nest in the open grip of a user's hand, said housing comprising:
      an upper shell, and
      a lower shell having an opening in a bottom portion thereof and litter collecting means on opposite sides of said opening, said upper and lower shells being joined along one side by hinge means and mating to define an enclosure;
   a cylindrical twisted-in-wire brush within said enclosure having bristles extending radially from a central shaft; and
   bidirectionally operable friction drive means for driving said cylindrical brush comprising:
      a spaced parallel pair of axles mounting wheels adjacent the ends thereof, one axle being disposed on each side of said brush,
      mounting means integral with said upper shell defining downwardly directed, open-ended necked slots for receiving said axles and said brush shaft in a snap-in fashion to support said wheels for rotation such that said wheels engage the surface being cleaned and are rotated by frictional forces developed between said wheels and said surface when the device is moved across the surface and to support said brush for rotation with a portion thereof protruding from said enclosure through said opening for engagement with the surface being cleaned, and
      gear means for coupling said axles and said brush such that rotation of said axles effects rotation of said brush, whereby to remove loose matter from a surface area the device is nested in the user's hand and swept back and forth across the surface.

13. A hand-held sweeping device for collecting surface litter, comprising, in combination:
   a molded housing configured to nest in the open grip of a user's hand, said housing comprising:
      an upper shell, and
      a lower shell having an opening in a bottom portion thereof and litter receiving means on opposite sides of said opening, said upper and lower shells being joined along one side by hinge means and mating to define an enclosure;
   a cylindrical twisted-in-wire brush within said enclosure having bristles extending radially from a central shaft;
   bidirectionally operable friction drive means for driving said cylindrical brush comprising:
      a spaced parallel pair of axles mounting wheels adjacent the ends thereof, one axle being disposed on each side of said brush, mounting means integral with said upper shell defining downwardly directed, open-ended necked slots for receiving said axles and said brush shaft in a snap-in fashion to support said wheels for rotation such that said wheels engage the surface being cleaned and are rotated by frictional forces developed between said wheels and said surface when the device is moved across the surface and to support said brush for rotation with a portion thereof protruding from said enclosure through said opening for engagement with the surface being cleaned, and gear means for coupling said axles and said brush such that rotation of said axles effects rotation of said brush; and a fixed brush supported by said housing for use in cooperation with said cylindrical brush, comprising:

a base slab integral with said housing extending axially from an end of said housing and upwardly at an acute angle with respect to the axis of said brush shaft, and bristle means secured in a plurality of spaced holes in a lower surface of said base slab and extending outwardly from said end of said housing, whereby to remove litter from a surface area, the device is held in the user's hand and swept back and forth across the surface, the fixed brush being used to brush litter inaccessible to said cylindrical brush into the path thereof.

14. The device defined by claim 13 wherein said housing includes a pair of parallel septums in each of said upper and lower shells which are oriented transverse to said brush shaft and disposed near the ends thereof, said pair of upper shell septums containing integrally said mounting means for said axles and brush shaft, the respective pair constituents of the upper shell septum pair and lower shell septum pair cooperating to divide said enclosure into a litter-receiving chamber which contains said litter-receiving means and opposed end portions, at least one of said end portions containing at least a part of said friction drive means, said septums furnishing structural support for said housing.

15. The device defined by claim 14 wherein said respective pair constituents of the upper shell septum pair and lower shell septum pair mate in an overlapped side engagement relationship to form two parallel walls which accomplish said division in said enclosure and which are substantially impervious to dirt and litter.

16. The device defined by claim 15 wherein said litter-collecting means in said lower shell are defined in part by an integral rib parallel to said brush shaft and extending upwardly from the floor of said lower shell on each side of said opening.

17. The device defined by claim 16 wherein said fixed brush bristles are of lengths such that the bristle ends define a substantially planar surface making a small acute angle with respect to the axis of said cylindrical brush shaft.

18. The device defined by claim 17 wherein said acute angle lies in the range of about 3 degrees to 15 degrees.

19. The device defined by claim 18 wherein said surface defined by said bristle ends is intersected by a plane substantially containing the lowermost surface of said housing.

20. The device defined by claim 19 including a plurality of substantially parallel spaced ribs integral with said housing and bridging said base slab and said end of said housing from which said base slab extends to strengthen the structural connection therebetween.

References Cited
UNITED STATES PATENTS

| | | | |
|---|---|---|---|
| 1,115,023 | 10/1914 | Rees | 15—41 R |
| 1,236,122 | 8/1917 | Suttle | 15—41 R |
| 1,371,615 | 3/1921 | Frankel et al. | 15—41 R |

EDWARD L. ROBERTS, Primary Examiner

U.S. Cl. X.R.

15—27